United States Patent
Sako et al.

(10) Patent No.: US 7,408,862 B2
(45) Date of Patent: Aug. 5, 2008

(54) WRITABLE RECORDING MEDIUM IDENTIFICATION INFORMATION RECORDING METHOD INFORMATION RECORDING DEVICE IDENTIFICATION INFORMATION REPRODUCTION METHOD AND INFORMATION REPRODUCTION DEVICE

(75) Inventors: Yoichiro Sako, Tokyo (JP); Tatsuya Inokuchi, Tokyo (JP); Shunsuke Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 10/505,177

(22) PCT Filed: Mar. 19, 2003

(86) PCT No.: PCT/JP03/03334

§ 371 (c)(1),
(2), (4) Date: Aug. 31, 2004

(87) PCT Pub. No.: WO03/081587

PCT Pub. Date: Feb. 10, 2003

(65) Prior Publication Data

US 2005/0099897 A1    May 12, 2005

(30) Foreign Application Priority Data

Mar. 22, 2002   (JP) .............................. 2002-081978

(51) Int. Cl.
*G11B 7/007* (2006.01)
(52) U.S. Cl. .................................... 369/59.25; 711/164
(58) Field of Classification Search .............. 369/59.25; 711/164
See application file for complete search history.

(56) References Cited

U.S. PATENT DOCUMENTS

| 5,515,351 | A  | * | 5/1996 | Nonaka et al. ........... 369/44.27 |
| 5,930,367 | A  | * | 7/1999 | Osawa et al. ................... 705/57 |
| 6,199,148 | B1 | * | 3/2001 | Naito .......................... 711/163 |
| 6,215,746 | B1 | * | 4/2001 | Ando et al. ................. 369/53.2 |
| 6,600,707 | B2 | * | 7/2003 | Tsukada .................... 369/47.22 |
| 6,621,783 | B1 | * | 9/2003 | Murata .................... 369/53.31 |
| 6,789,177 | B2 | * | 9/2004 | Okada ......................... 711/164 |
| 7,057,993 | B2 | * | 6/2006 | Barnard et al. ........... 369/53.21 |

(Continued)

FOREIGN PATENT DOCUMENTS

JP        08-006729        1/1996

(Continued)

*Primary Examiner*—Gautam R Patel
(74) *Attorney, Agent, or Firm*—Oblon, Spivak, McClelland, Maier & Neustadt, P.C.

(57) ABSTRACT

An information playback method and apparatus that includes reading first identification information from an auxiliary recording region of a recording medium, including the auxiliary recording region in which writing of content data is prohibited and a main storing region in which the content data can be written and reading second identification information from the main recording region. When first identification information is read from the auxiliary recording region and second identification information is read from the main recording region, comparing the first identification information with the second identification information, and outputting the content data read from the main recording region when the first identification information corresponds to the second identification information. When first identification information is not read from the auxiliary recording region or second identification information is not read from the main recording region, outputting the content data read from the main recording region.

9 Claims, 7 Drawing Sheets

U.S. PATENT DOCUMENTS 7,149,175 B2 * 12/2006 Sako et al. ............... 369/275.3

FOREIGN PATENT DOCUMENTS

| | | |
|---|---|---|
| JP | 8-31080 | 2/1996 |
| JP | 11-283328 | 10/1999 |
| JP | 11-306645 | 11/1999 |
| JP | 2000-149414 | 5/2000 |
| JP | 2000-155943 | 6/2000 |
| JP | 2000-286839 | 10/2000 |
| JP | 2000-293926 | 10/2000 |
| JP | 2000-293936 | 10/2000 |
| JP | 2000-298926 | 10/2000 |
| JP | 2001-202694 | 7/2001 |
| JP | 2001-243635 | 9/2001 |
| JP | 2001-243636 | 9/2001 |
| JP | 2001-319329 | 11/2001 |
| JP | 2001-319339 | 11/2001 |
| JP | 2001-332019 | 11/2001 |
| JP | 2001-332022 | 11/2001 |
| JP | 2002-56608 | 2/2002 |
| WO | 97/14144 | 4/1997 |
| WO | 01/06502 | 1/2001 |

* cited by examiner

| CONTROL 4 BITS | ADDRESS 4 BITS | DATA (72 BITS) | CRC 16 BITS |

WRITABLE RECORDING MEDIUM IDENTIFICATION INFORMATION RECORDING METHOD INFORMATION RECORDING DEVICE IDENTIFICATION INFORMATION REPRODUCTION METHOD AND INFORMATION REPRODUCTION DEVICE

CROSS REFERENCE TO RELATED APPLICATIONS

This application is a National Stage of PCT/JP03/03334 filed on Mar. 19, 2003, which claims priority to Japanese Patent Application No. 2002-81978 filed on Mar. 22, 2002.

TECHNICAL FIELD

The present invention relates to writable recording media, identification information recording methods, information recording apparatuses, identification information playback apparatuses, and information playback apparatuses. More specifically, in a recording medium on which information can be added or rewritten, such as a CD-R or a CD-RW, when content is recorded, second identification information corresponding to first identification information is recorded in a content recording area, the first identification information being recorded on the recording medium when the recording medium is initialized, and when the content is played back, existence of the first and second identification information is confirmed and the first identification information is compared with the second identification information, so that the recording medium is determined to be a legitimate recording medium or a copied recording medium readily and reliably and that illegal copying can be eliminated.

BACKGROUND ART

For disc-shaped recording media, such as compact discs (CDs) and digital versatile disks (DVDs), measures have been taken to protect productions, such as content, by preventing content recorded on such recording media from being illegally copied. Compact discs with copy protection will be sold.

However, since content of compact discs without copy protection is easily copied, copied CD-Rs and CD-RWs are distributed. It is obvious that illegal copying by evasion of copy protection exists. In this case, such copied discs will also come into circulation.

Since no measures are taken for copy protection for copied discs, copying of a copied disc (CD-R, CD-RW, or the like) to another disc (CD-R, CR-RW, or the like) is permitted without any restriction. Such copying may reach beyond personal use, and this is also unwanted in view of protecting copyright holders.

In addition to the recording media mentioned above, DVD-Rs, DVD-RWs, and the like are viewed as disc-shaped recording media that can be copied and that may need copy protection.

The present invention solves the known problems described above and proposes, in particular, a writable recording medium, an information recording method, an information playback method, an information recording apparatus, and an information playback apparatus that record copy-protectable information on the writable recording medium and that determine the recording medium to be a copied recording medium when the information is not satisfied when playing back the recording medium.

DISCLOSURE OF INVENTION

The present invention aims at a writable recording medium (disc-shaped recording medium), such as a CD-R. The writable recording medium (hereinafter, simply referred to as a disc) is divided into a main recording region and an auxiliary recording region. Normally, the main recording region is a region in which content or the like can be written from an external information terminal apparatus. In contrast, in most cases, the auxiliary recording region is a region in which information (data) cannot be written from an information terminal apparatus. For example, taking a CD-R as an example, a program area (data area) corresponds to a main recording region and a lead-in area and a program memory area (PMA) provided at the inner side of the lead-in area correspond to an auxiliary recording region.

Identification information (disc ID) unique to an information recording apparatus (disc driver) is written in the program memory area PMA when initializing a disc and is written as part of sub-code information (more specifically, Q-channel information), together with TOC (Table of Contents) information, when completing or finalizing the disc to terminate recording processing for the disc.

This identification information (hereinafter, referred to as first identification information) is used as one piece of disc determination information in the present invention. In other words, when content is recorded in the program area, second identification information corresponding to the first identification information is recorded in the program area in an interval of recording operations of the content, at the same time as the recording of the content, or at predetermined timing. The second identification information is the same as the first identification information, converted information (identification information of other forms or key information for encryption), or the like.

As described above, when a writable recording medium on which the first and second identification information is recorded is played back, the first and second identification information itself should be played back from a playback system. If this is the same as that when recording is performed, the disc is determined not to be a copied disc but to be a legally purchased disc. Hereinafter, a disc on which the first and second identification information is recorded is referred to as a genuine disc.

However, when a disc that is not a legally purchased disc, in other words, a disc that is not a genuine disc but a copied disc is first loaded into an information playback apparatus, the disc is initialized, as described above. When the disc is initialized, if an information playback apparatus storing a processing program for writing information (disc ID) unique to the apparatus into which the disc is loaded in a program memory area is used, the disc ID (called a copied disc ID) unique to the apparatus is automatically recorded in the program memory area. Since the copied disc ID cannot be written from an information terminal apparatus (personal computer), the disc ID unique to the apparatus is always written.

When the content of a genuine disc is copied using the copied disc, content recorded in the program area can be copied. Also, TOC information and the like among the content recorded in the program memory area can be copied. However, genuine disc ID information cannot be copied.

Accordingly, although the first identification information (genuine disc ID information) is acquired when the program memory area is played back using the genuine disc, the copied disc ID is acquired from the copied disc. Since the second identification information is recorded in the program area of the genuine disc, the second identification information is acquired. The second identification information is the first identification information itself or information corresponding to the first identification information.

Assuming that the second identification information is equal to the first identification information, the second identification information and the copied disc ID are acquired from the copied disc. Obviously, the second identification information is not equal to the copied ID. Accordingly, the loaded disc is determined to be a copied disc. This is because, for the genuine disc, the first identification information should be equal to the second identification information.

A writable disc in which a disc ID is written in a program memory area and no identification information is recorded in a program area may exist. Since this disc is viewed as a genuine disc, by permitting playback as normally, determination of a copied disc can be performed while making that disc compatible with a current disc (writable recording medium).

Instead of writing the second identification information itself in the program area, the second identification information may be used as key information (secret key information) used for encrypting content when the first identification information is acquired. In this case, the first identification information (for example, disc ID) itself can be used as key information. Content data and sub-code data to be recorded on the disc is encrypted. Accordingly, even if the disc is copied, protection of the content itself and the sub-code data can be ensured. Using a plurality of pieces of key information having a hierarchy structure further ensures confidentiality of content. In this case, the second identification information is viewed as being included in the encrypted content. Also, information associated with the first identification information may be recorded as the second identification information at the same time.

Playback of content is controlled such that opening a switch in a playback system prevents output of the content. In addition to this, prohibiting (canceling) a playback mode itself or lowering the output quality while allowing the content to be output prevents sharing of a substantial service. For example, for images, processing for lowering the image quality or scrambling processing can be performed.

BEST MODE FOR CARRYING OUT THE INVENTION

Next, starting from a writable recording medium according to the present invention, an information recording method and the like according to embodiments will be described with reference to the drawings.

Figure 1:
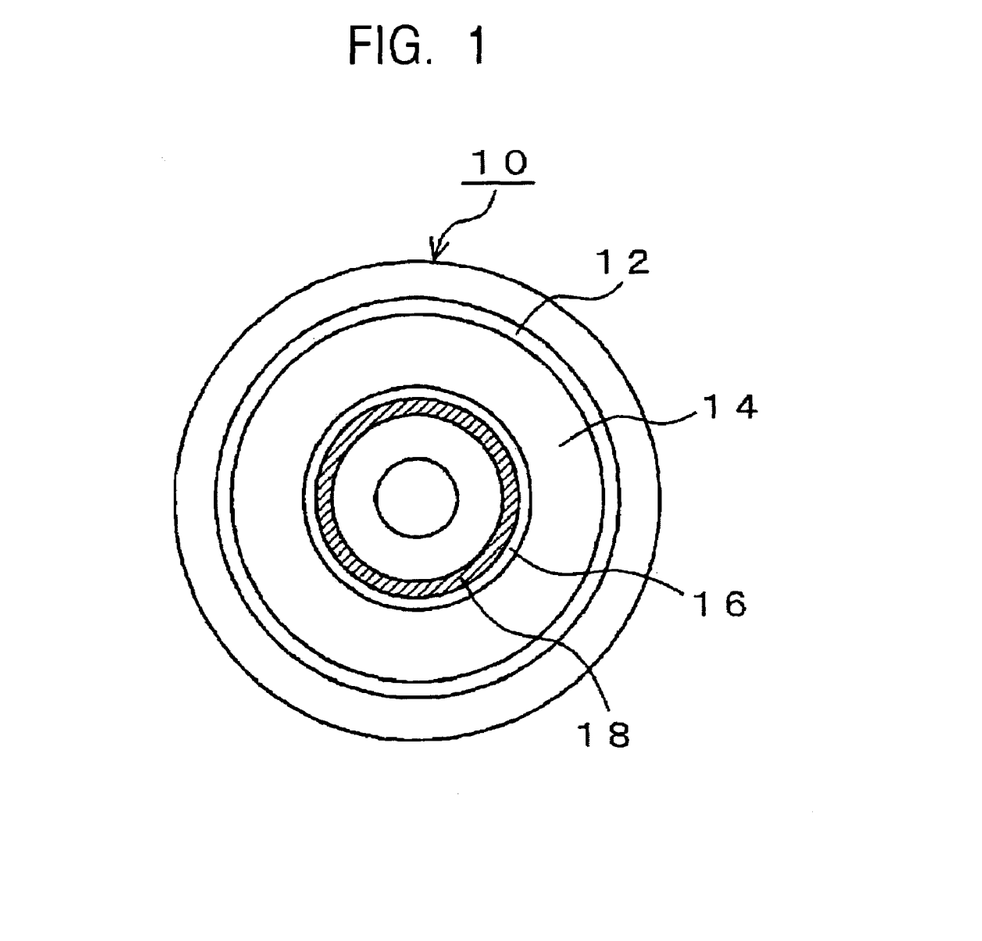
FIG. 1 is a conceptual drawing of a writable recording medium according to an embodiment of the present invention.

FIG. 1 shows a disc-shaped recording medium 10, which is a writable recording medium according an embodiment of the present invention. The recording medium 10 is a writable recording medium including a program area 14 arranged in a main recording region and a lead-in area 16 and a program memory area 18 arranged in an auxiliary recording region. The program area 14 arranged in the main recording region functions as a region writable from an information terminal apparatus. The lead-in area 16 and the program memory area 18 arranged in the auxiliary recording region function as a region not writable from the information terminal apparatus.

First identification information is recorded in the program memory area 18 that belongs to the innermost circumference, from the lead-in area 16 and the program memory area 18 arranged in the auxiliary recording region. Particular content and second identification information corresponding to the first identification information recorded in the auxiliary recording region are recorded in the program area 14 arranged in the main recording region.

For compact discs CDs, write once CD-Rs, rewritable CD-RWs, and the like are typical examples of writable recording media. For digital versatile disks DVDs, write once DVD-Rs, rewritable DVD-RWs, and the like are typical examples of writable recording media.

Hereinafter, a CD-R is exemplified as a writable recording medium (hereinafter, referred to as a disc).

The basic structure of the disc-shaped recording medium 10 is the same as that of known discs. As shown in FIG. 1, a lead-out area 12 is arranged in the outermost circumference, and the program area (PA) 14, which is a content recording area, exists inside the lead-out area 12. The program area 14 corresponds to the main recording region. The lead-in area 16, which records the TOC information, is arranged in the inner circumference of the program area 14. The program memory area (PMA) 18 is arranged further inside. The lead-in area 16 and the program memory area 18 correspond to the auxiliary recording region.

As is generally known, tentative TOC information, which is information before completion processing or finalization processing, is recorded in the program memory area 18. During the time when the tentative TOC is recorded in the program memory area 18, content can be written in the program area 14. However, when an operation for completion processing is performed, TOC information is written in the lead-in area 16, and the subsequent writing (recording) processing cannot be performed.

In the present invention, the first identification information is recorded in the program memory area 18. The first identification information is recorded when a disc is initialized. Since the first identification information is used as disc determination information, as described below, various types of content may be provided. In the example described below, information (unique ID) unique to an information recording apparatus is used. The unique ID is a random serial number used as a disc ID and acquired from a random number generator installed in the apparatus.

Figure 2:
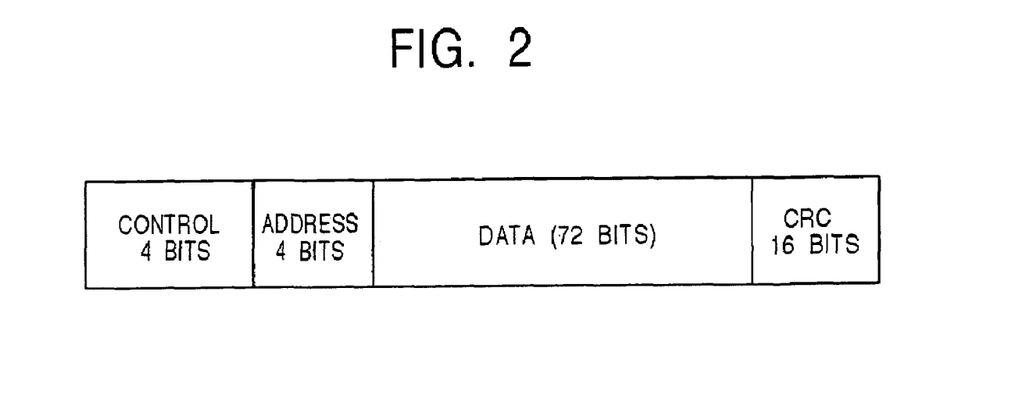
FIG. 2 shows an example of the frame structure of a Q-channel frame.

The disc ID is inserted in part of sub-code recorded in the program memory area 18. FIG. 2 shows the frame structure of a Q-channel of the sub-code.

Since the frame structure is well known, the detailed description about the structure is omitted here. As shown in FIG. 2, 4-bit control data, 4-bit address data, 72-bit data, and 16-bit error detection code CRC (Cyclic Redundancy Check) are provided.

When the address data ADR is represented by ADR=1 (=0001), the TOC information is inserted as the subsequent data. When the address data ADR is represented by ADR=2 (=0010), maker optional data is inserted in the subsequent data area.

In this embodiment, a disc ID represented by a BCD (Binary Code Decimal) code is inserted in the data area. The BCD code has a 6-digit structure (=4 bits×6 digits=24 bits). For example, MIN and SEC representing elapsed time in a movement inserted in the data area and FRAME bits (8×3=24 bits) are used. Random data (this may include a number and a sign) may be used as the disc ID. In this example, a disc ID having a number (serial number) of 7 to 10 digits generated in a random fashion is inserted as the first identification information.

The disc ID is recorded in the lead-in area 16 as the first identification information by the completion processing, and the content is fixed. Thus, from that time, the first identification information cannot be rewritten.

In this embodiment, when content is recorded in the program area 14, the second identification information corresponding to the first identification information is recorded at the same time as recording of the content or in an interval of recording operations of the content.

The second identification information may be equal to the first identification information. Alternatively, the second identification information may be information obtained by converting the first identification information. Obviously, the second identification information may be key information for decrypting encrypted content. Information (the content and the second identification information) recorded in the program area 14 is also fixed by the completion processing.

The first and second identification information is used as information for determining whether the disc is a genuine disc or a copied disc. If the first identification information and the second identification information are associated with each other, the disc is determined to be a genuine disc. If the first identification information and the second identification information are not associated with each other, the disc is determined to be a copied disc, as described above.

Here, when the first identification information (disc ID) is represented by PMA1, the second identification information written in the program area 14 is represented by PA1, and the first identification information itself is used as the second identification information, the following equation is satisfied:

$$PMA1=PA1.$$

In other words, they must be equal to each other.

In contrast, if the whole genuine disc is copied, all the information written in the program area PA of the genuine disc can be copied. However, the information written in the program memory area PMA cannot be copied.

Information (first identification information) written in the program memory area PMA of the copied disc is represented by PMAc, and information (second identification information) written in the program area PA of the copied disc is represented by PAc.

In contrast, a disc ID is recorded in the program memory area of the copied disc when the disc is initialized. The copied disc ID is an ID (serial number) unique to an information recording apparatus into which the disc is loaded. Thus, when the information recorded on the copied disc is compared, the following expression is obtained:

$$PMAc \neq PAc.$$

Since the equation PAc=PA1 is satisfied, the first and second identification information played back from the copied disc are found to be different from each other. Thus, the disc to be played back is determined to be a copied disc.

An information recording apparatus according to an embodiment for realizing such an identification information recording method will now be described with reference to FIG. 3.

For example, when a recording mode is selected, a disc ID is written in the program memory area 18 as first identification information by initialization processing. If a disc ID has already been written, transition to the recording mode is performed.

When the initialization processing is performed, a control unit (control means) 22 provided with a CPU operates a random number generator 24 to generate a random serial number (for example, a 7- to 8-digit number). The serial number (disc ID information) is subjected to error correction and encoding processing with a predetermined format by an error correction and encoding circuit 26, and then is subjected to EMF modulation (8-18 modulation) appropriate for the disc by a modulator 28. Error correction and encoding processing (double error correction processing) by known CIRC (Cross Interleave Reed-Solomon Code) is used as error correction processing. For DVD disks, which are one type of writable recording media, error correction and encoding processing using RS-PC (Reed-Solomon Product Code) is performed although this is not illustrated as an embodiment.

After performing the error correction and encoding processing, by being guided by an optical pickup unit (PU) 32 via a recording circuit 30 formed of an amplifier, a laser (not shown) provided inside the optical pickup unit 32 is controlled to function as recording power. As a result of this, the disc ID (first identification information) is recorded (temporarily recorded) in the program memory area 18 of the disc-shaped recording medium 10 with the disc ID inserted in a predetermined area of a Q-channel of sub-code.

After the initialization, transition to the recording mode is performed. In the recording mode, content data to be recorded is supplied to a terminal 33, and the content data is supplied to the error correction and encoding circuit 26 via a switching unit 34. Then, the content data is subjected to the same processing as the disc ID, and is recorded in the program area 14.

At the same time as the recording, or before the recording, the optical pickup unit 32 is driven to a place of the program memory area 18 so that information written in each area from the program memory area 18 to the program area 14 is read. The read information is supplied to a demodulator 38 via an RF amplifier 36, and is further supplied to a sub-code decoder 40 to decode the sub-code.

Then, the sub-code is supplied to a disc ID extractor 42 and only the disc ID (PMA1) is extracted. The extracted disc ID is supplied to the switching unit 34. In contrast, the disc ID is also supplied to the control unit 22. When the disc ID is identified, switching control means 44 is controlled at predetermined timing to switch the switching unit 34 from a state shown by a solid line to a state shown by a broken line.

In this processing, the same content of the disc ID, which is first identification information, is recorded in the program area 14 as second identification information. The second identification information is recorded in the program area 14 with intervals that do not interfere with playback. The second identification information can also be inserted in a data area of the Q-channel of the sub-code represented by ADR=2. Recording the disc ID into the program area 14 may be performed in synchronization with recording of content. Alternatively, the disc ID may be recorded independently from input of content data.

In an information recording apparatus 20, similarly to general optical disc recording apparatuses, a control signal from the control unit 22 is supplied to a servo controller 46 and controls a linear velocity of rotation of a spindle motor (M) 47 to be constant. Also, part of output of the RF amplifier 36 is supplied to the servo controller 46 to perform tracking servo and focus servo by the optical pickup unit 32. Furthermore, as in known optical disc recording apparatuses, in addition to memory means 48, such as a ROM and a RAM, an operation key 50 and a display unit 52 are associated with the control unit 22, so that controlling an operation mode, selecting the operation mode, and displaying the result are performed.

Figure 3:
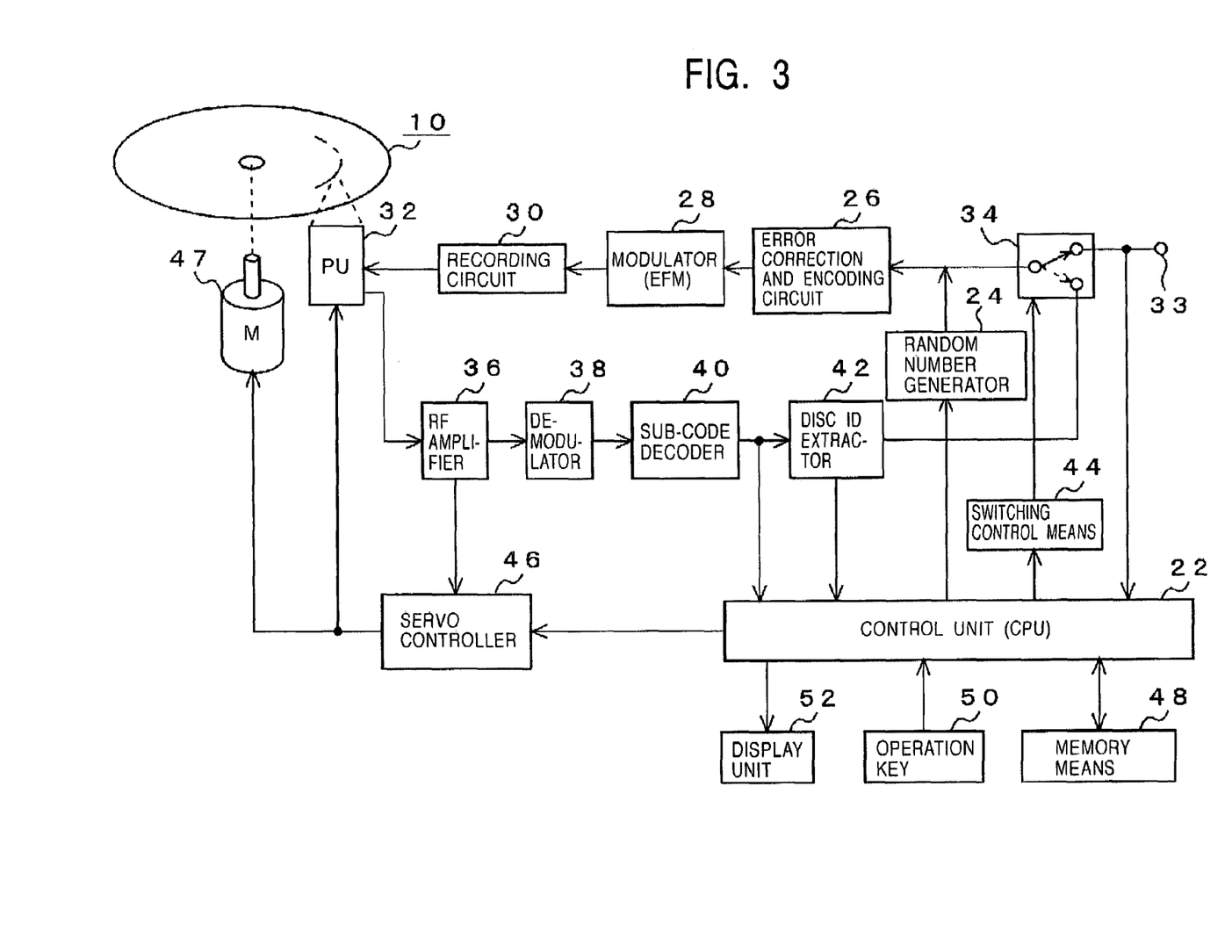
FIG. 3 is a systematic diagram of a substantial part of an information recording apparatus according to an embodiment of the present invention.
Figure 4:
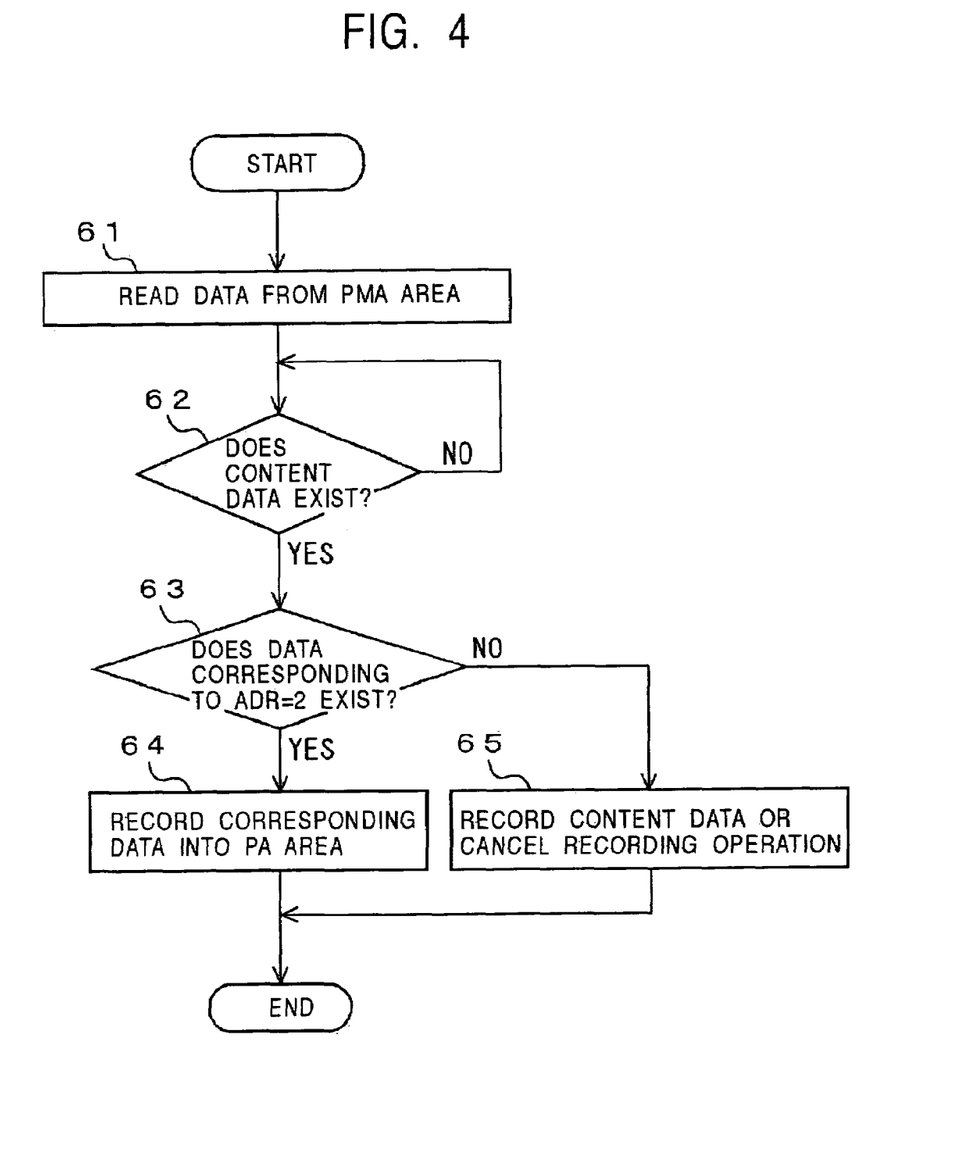
FIG. 4 is a flowchart showing an example of a recording process when identification information is recorded.

FIG. 4 shows an example of a process for recording the second identification information. When content recording processing is performed, the first identification information (disc ID) is read from the program memory area 18 of the disc-shaped recording medium 10 (step 61). Then, it is determined whether or not content data is supplied (step 62). A state of input of the content data is determined by guiding the content data to the control unit 22, as shown in FIG. 3.

After checking the existence of the content data, address data of a read Q-channel is monitored (step 63). If the first identification information exists, corresponding information (second identification information) is recorded in the program area 14 (step 64).

However, if corresponding information does not exist, a mode for recording the content data is maintained or a recording operation is forcibly cancelled to terminate the recording mode (step 65).

Here, recording the content data is continued in order to achieve compatibility with an information recording apparatus that does not record a disc ID on a disc when initializing the disc. This is because content must be recorded taking a case where a genuine disc is loaded into an apparatus without recording a disc ID into consideration. Obviously, in such a case, the recording mode may be forcibly canceled, as in step 65.

Figure 5:
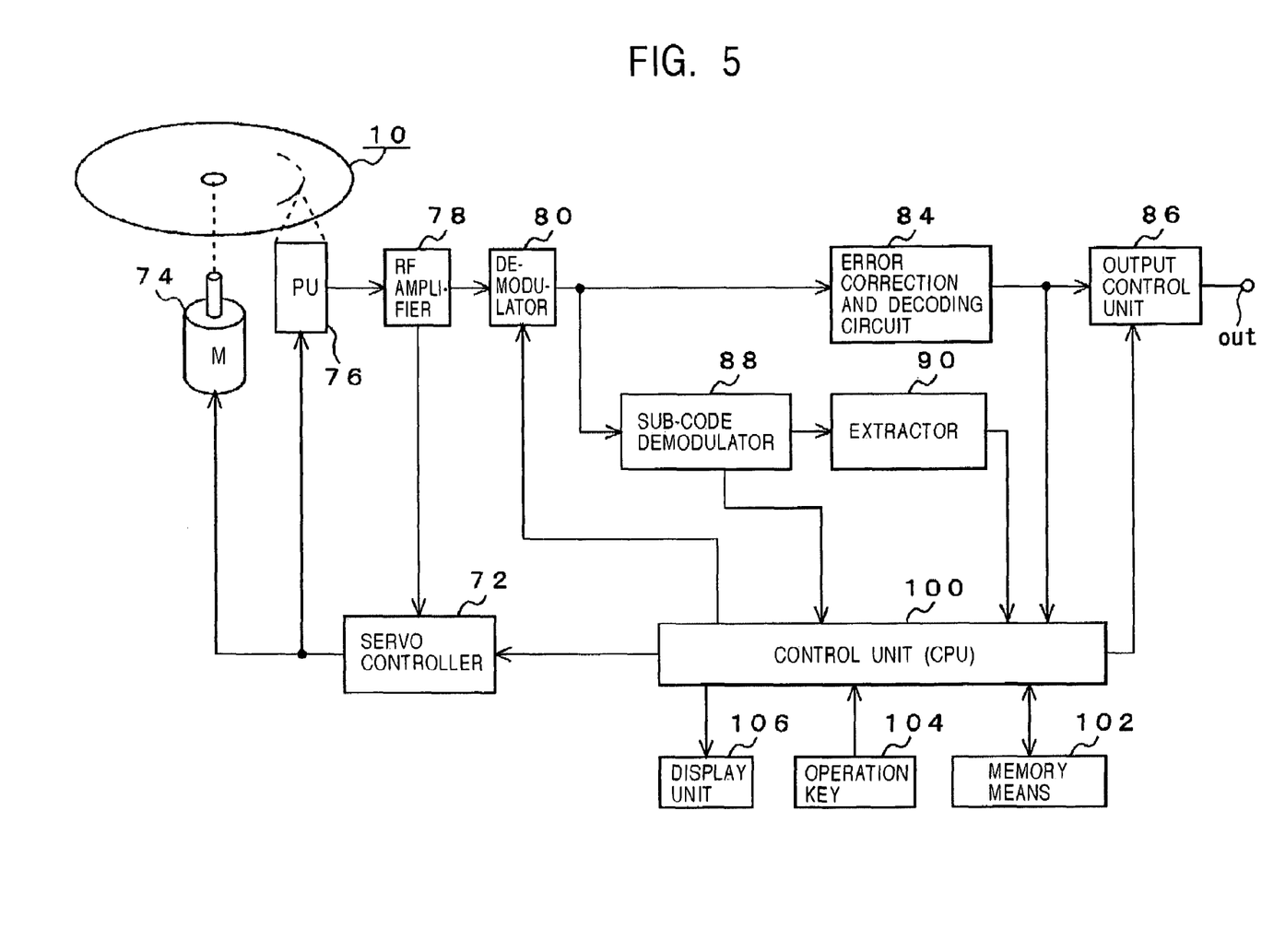
FIG. 5 is a systematic diagram of a substantial part of an information playback apparatus according to an embodiment of the present invention.

FIG. 5 is a systematic diagram of a substantial part of an information playback apparatus 70 according to an embodiment of the present invention that can realize an information playback method according to the present invention.

In a state in which a servo controller 72 is controlled by a control signal from a control unit 100 to rotate a spindle motor 74 and the linear velocity of the disc-shaped recording medium 10 is made constant, recorded information is read from the disc-shaped recording medium 10 by an optical pickup unit 76. A read optical signal is converted into an electric signal inside the unit and is supplied to a demodulator 80 via an RF amplifier 78 so that demodulation (EMF demodulation) of the information is performed. From among demodulation output, information recorded in the program area 14 is subjected to error correction and decoding processing by an error correction and decoding circuit 84 provided downstream. Then, the information is output as playback output information via an output control unit 86. Also, from among decoding output, second identification information recorded in the program area 14 is supplied to the control unit 100 as information for comparison. The second identification information may be temporarily stored in memory means (a ROM, a RAM, and the like) 102 provided in the control unit 100.

The demodulation output is further supplied to a sub-code demodulator 88, and sub-code information recorded in the lead-in area 16 is demodulated. The sub-code information is supplied to the control unit 100, and an address, time information, and the like of the disc-shaped recording medium 10 are managed. The sub-code information is also supplied to an extractor 90 for Q-channel information. In the Q-channel, in particular, a disc ID inserted in the Q-channel is read, and the read disc ID is supplied to the control unit 100.

The control unit 100 compares the first identification information, which is the read disc ID, and the second identification information. If they are associated with each other, the disc is determined to be a genuine disc. Then, the output control unit 86 is controlled to permit output to the outside.

In contrast, if they are determined not to be associated with each other, the disc is determined to be a copied disc. The output control unit 86 and the like are controlled to prohibit output to the outside. In addition to the prohibition processing, the output control unit 86 may be controlled to forcibly terminate the playback mode or to output an output signal with a reduced quality. Reducing the quality of a signal or scrambling processing is applied to, for example, discs that deal with images, such as DVDs, as writable recording media. Outputting images with a reduced quality can achieve a similar effect to that obtained by processing for prohibiting output.

Figure 6:
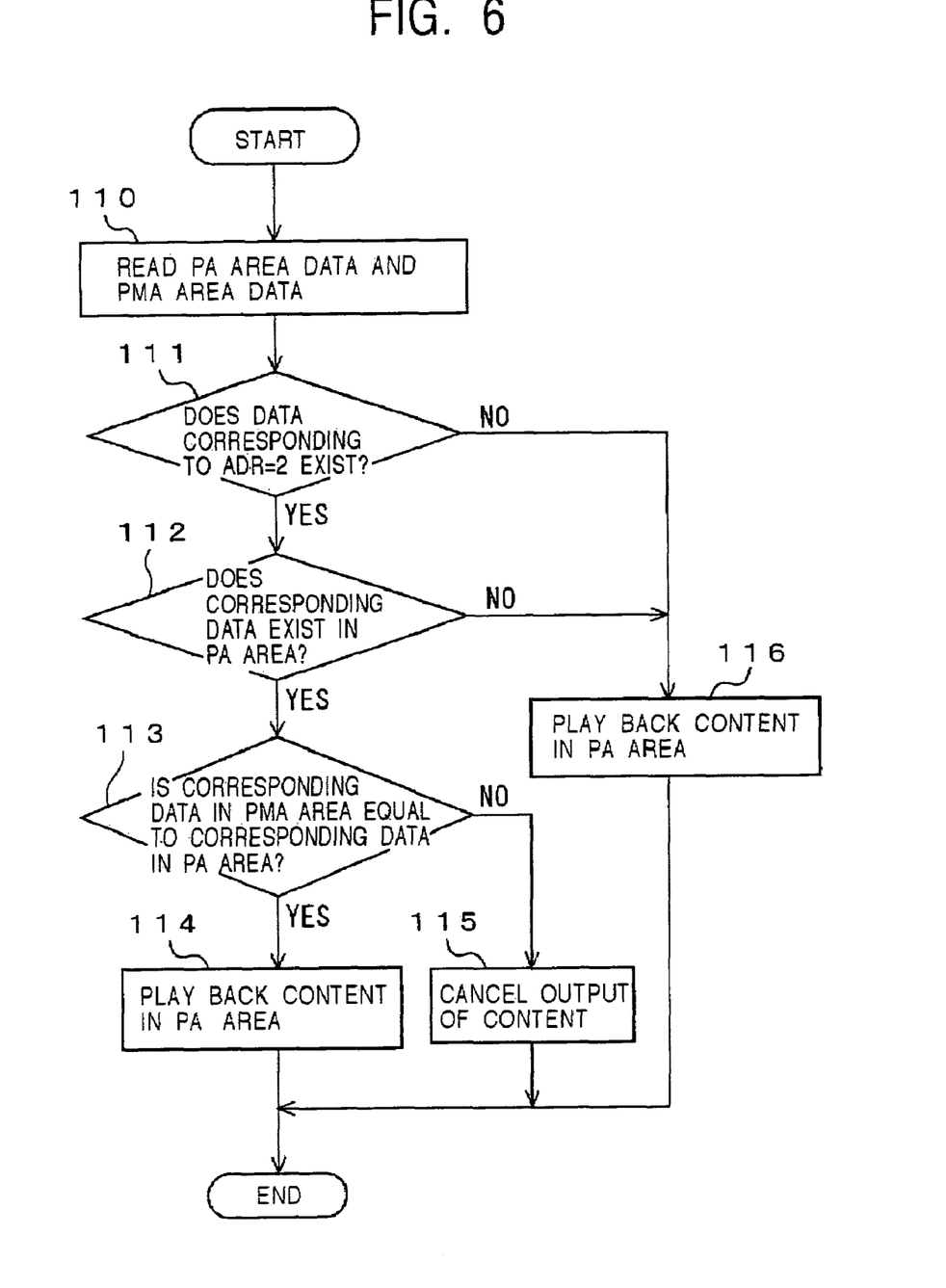
FIG. 6 is a flowchart showing an example of a process for playing back the identification information.

FIG. 6 is a flowchart showing a process for playing back identification information and for determining a genuine disc.

Data (first and second identification information) recorded in the program area 14 and the lead-in area 16 (or the program memory area 18) is read (step 110), and it is determined whether or not a disc ID functioning as the first identification information exists in a Q-channel (step 111).

If the disc ID exists, it is determined whether or not the second identification information exists (step 112). If the second identification information exists, the second identification information is compared with the first identification information (step 113). If the first identification information itself is used as the second identification information, they are the same disc ID. If they are determined to be equal to each other from the comparison, a disc being played back is determined to be a genuine disc. Then, playback of content is permitted (step 114).

However, if the second identification information is different from the first identification information even though the second identification information exists, the disc currently being played back is determined to be a copied disc. Then, processing for canceling playback output of the content is performed (step 115). This is because that, for a copied disc, a disc ID of an apparatus used when the disc is copied is recorded as the first identification information. An example of cancellation processing is as described above.

For a case where a disc ID is not inserted in the Q-channel or a case where the second identification information is not recorded in the program area 14 even though the disc ID is inserted in step 111, processing for playing back content can be performed in this example (step 116).

This is because that since whether or not a disc ID is inserted is a thing relating to an option, types of recording apparatuses not compatible with recording of a disc ID are also taken into consideration. This is also because that a legitimately recorded disc may exist even in a case where an apparatus that is compatible with recording of a disc ID is used. Thus, this processing ensures compatibility.

As described above, if the second identification information has something to do with the first identification information, the second identification information is not necessarily a disc ID. For example, content to be recorded may be encrypted by using the first identification information as key information for encrypting the content and the second identification information that is equal to the first identification information may be recorded, together with the encrypted content, in the program area 14.

Alternatively, it is also possible that existence of the first identification information is confirmed and that content is encrypted by using key information independently prepared. In this case, the second identification information is assumed to be included in the encrypted content. Alternatively, the key information may be programmed with a hierarchical structure such that the content is encrypted using a plurality of pieces of key information.

Figure 7:
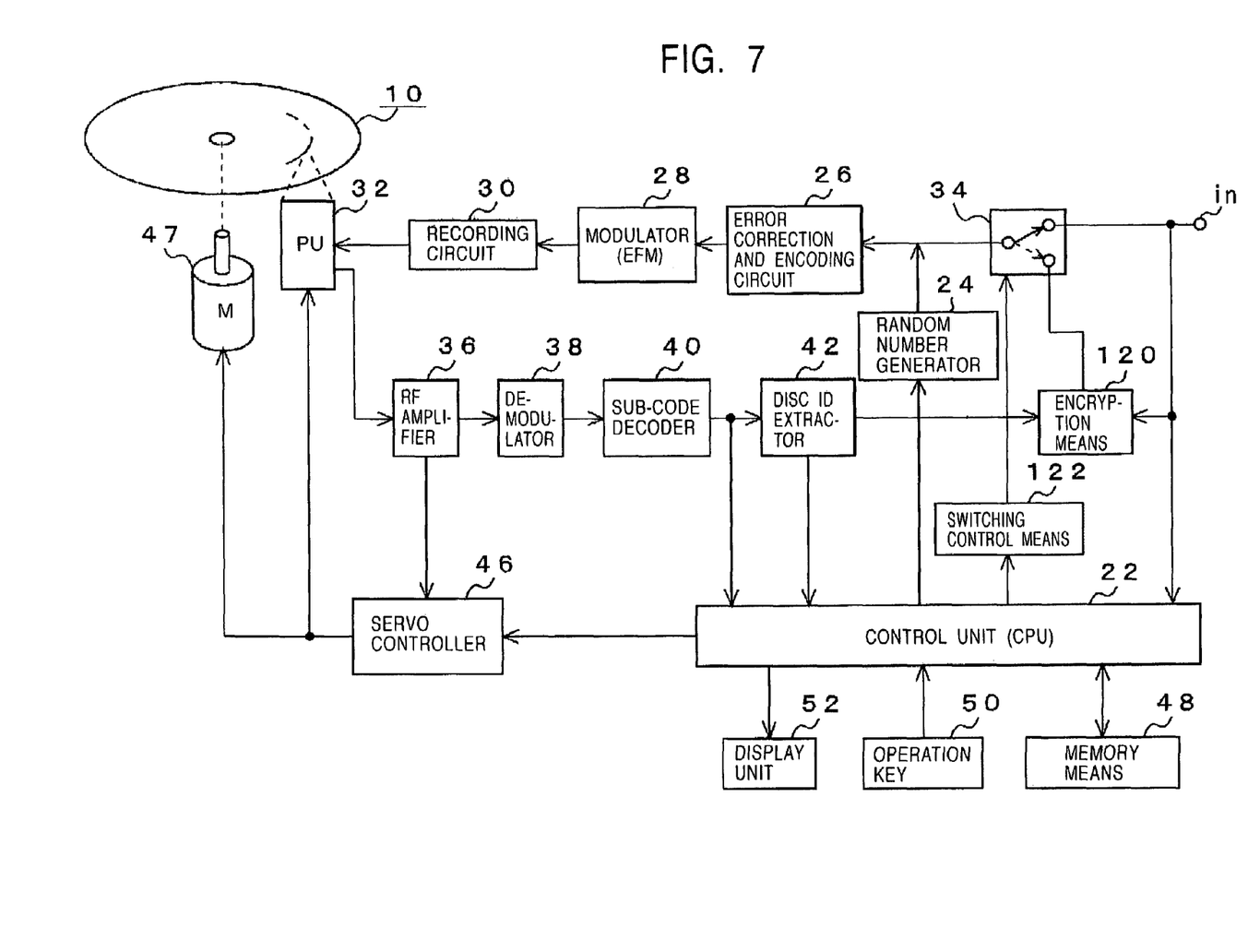
FIG. 7 is a systematic diagram of a substantial part of an information recording apparatus according to another embodiment of the present invention.

FIG. 7 is a systematic diagram of a substantial part of an information recording apparatus according to another embodiment of the present invention that is used for encryption.

Parts corresponding to those in FIG. 3 are represented by the same reference numerals and detailed explanations for the parts are omitted here. In this embodiment, encryption means 120 is provided. Content data is input here, and first identification information played back from the disc-shaped recording medium 10 is also supplied here. In a stage where the first identification information is confirmed, encryption of the content is performed. At the same time, the control unit 22 controls switching control means 122 to switch the switching unit 34 to a state shown by a broken line.

By this switching processing, the encrypted content is recorded in the program area 14 of the disc-shaped recording medium 10, together with the second identification information that is converted into information associated with the first identification information.

A case where a disc ID is not recorded on the disc-shaped recording medium 10 used for recording may exist. In this case, the switching unit 34 is kept in a state shown by a solid line, and content that is not encrypted is recorded. Information to be encrypted may be sub-code data as well as the content data mentioned above.

Figure 8:
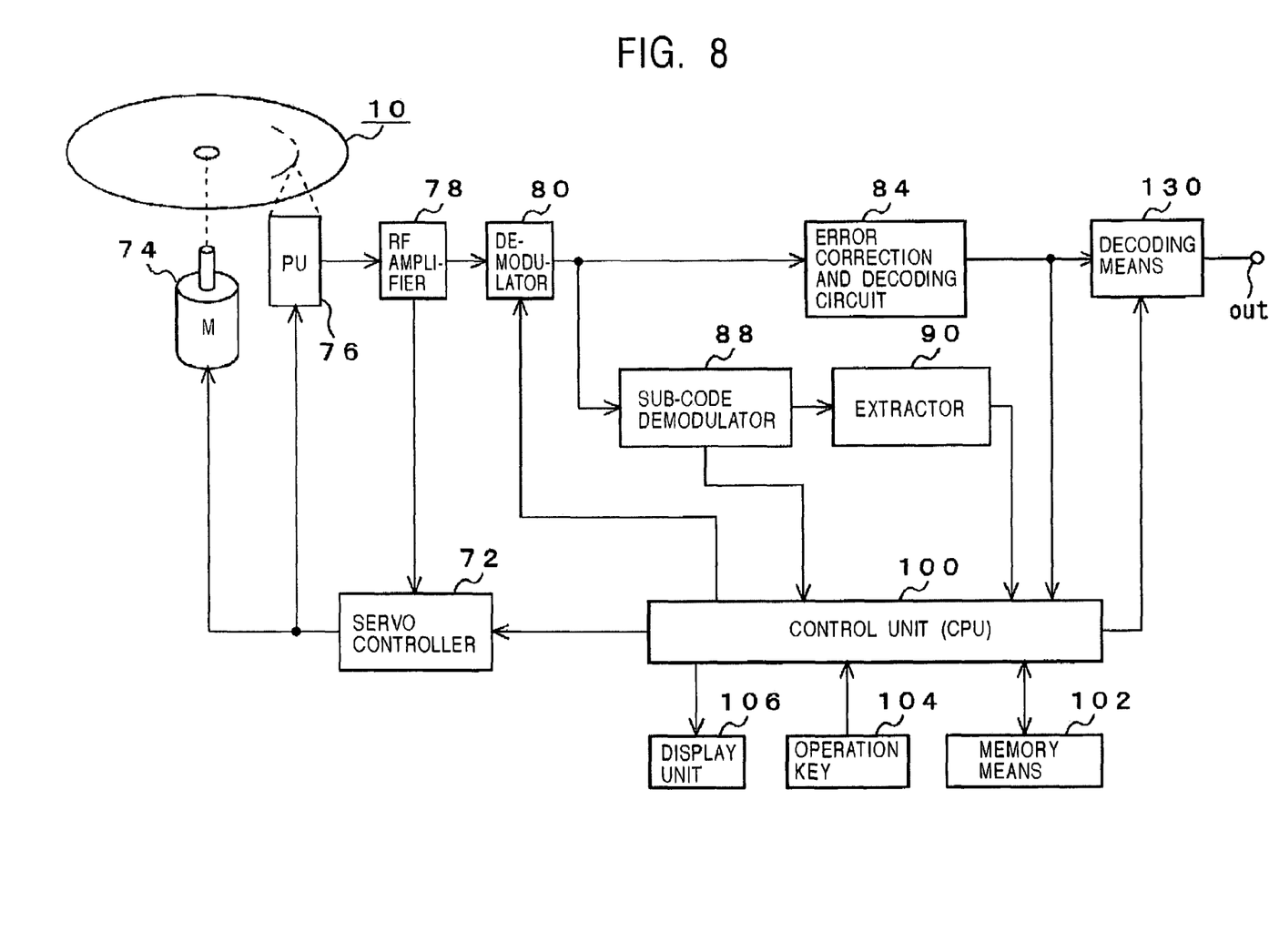
FIG. 8 is a systematic diagram of a substantial part of an information playback apparatus according to an embodiment of the present invention.

FIG. 8 is a systematic diagram of a substantial part of an information playback apparatus according to an embodiment of the present invention that can be applied when the encrypted content is played back.

Since an information playback apparatus 110 is arranged in a similar way to the information playback apparatus 70 shown in FIG. 5, the same parts as the arrangement in FIG. 5 are represented by the same reference numerals and detailed explanations for the parts are omitted here.

In this embodiment, instead of the output control unit shown in FIG. 5, decoding means 130 for decoding the encrypted content is provided and playback information from the error correction and decoding means 84 is supplied to the control unit 100. Since the first identification information extracted from the Q-channel is supplied to the control unit 100, if the disc is determined to be a genuine disc from the first and second identification information, the content is decoded in the decoding means 130 using the first identification information as key information.

If the disc is a copied disc, the first identification information itself is different. Thus, not only the first identification information is not associated with the second identification information, but the encrypted content cannot also be decrypted from the second identification information. Therefore, illegal copying of content can be eliminated.

The first and second identification information described above can also be used as authentication data. In this case, for example, if a purchaser of a disc accesses a disc administrator via a network, such as the Internet, to register for a disc ID, the disc ID can be used as authentication data for the legitimate purchaser.

Although, in the embodiments described above, a CD-R has been explained as a disc-shaped recording medium according to the present invention, the present invention is also applicable to any writable recording medium, such as a CD-RW, a DVD-R, or a DVD-RW. Obviously, the disc-shaped recording medium is not limited to an optical disc. The disc-shaped recording medium may be a magnetic disk.

INDUSTRIAL APPLICABILITY

As described above, when writing particular content into a main recording region arranged in a writable recording medium, an identification information recording method and an identification information recording apparatus according to the present invention read first identification information recorded in an auxiliary recording region and write second identification information corresponding to the first identification information into the main recording region.

Accordingly, the identification information recording method and the identification information recording apparatus are characterized in that by permitting playback only when the first identification information and the second identification information are associated with each other, playback of copied content can be eliminated even if an illegally copied recording medium is loaded.

Since content can be encrypted by the second identification information, this is useful for further ensuring elimination of illegal copying of content with high confidentiality.

A writable recording medium according to the present invention aims at a writable recording medium and is characterized in that first identification information is recorded in an auxiliary recording region arranged in the recording medium and that particular content and second identification information corresponding to the first identification information recorded in the auxiliary recording region are recorded in a main recording region.

By using such a recording medium, the first and second identification information can be used as determination information for determining a genuine recording medium. Thus, the recording medium is characterized by eliminating illegal copying. In other words, the recording medium can be provided as a recording medium with copy protection.

Also, an information playback method and an information playback apparatus according to the present invention are arranged such that when content recorded on a writable recording medium is played back, an auxiliary recording region arranged in the recording medium is played back to read first identification information recorded in the auxiliary recording region, and at the same time, a main recording region is played back to read second identification information recorded in the main recording region and that output of the content is controlled in accordance with a relationship between the played-back identification information.

Accordingly, content is effectively used only when the two pieces of played-back identification information are associated with each other. Thus, since no correspondence relationship is found in a copied recording medium, protection of the content can be ensured. As a result of this, the information playback method and the information playback apparatus are characterized in that elimination of use of copied content can be ensured.

Consequently, the present invention is significantly suitable to be applied to a recording medium, a recording/playback apparatus, and the like for eliminating a copied disc.

The invention claimed is:

1. An information playback method comprising:
reading first identification information from an auxiliary recording region of a recording medium, including the auxiliary recording region in which writing of content data is prohibited and a main storing region in which the content data can be written and reading second identification information from the main recording region, and when first identification information is read from the auxiliary recording region and second identification information is read from the main recording region, comparing the first identification information with the second identification information, and outputting the content data read from the main recording region when the first identification information corresponds to the second identification information; and when first identification information is not read from the auxiliary recording region or second identification information is not read from the main recording region, outputting the content data read from the main recording region.

2. The information playback method according to claim 1, wherein when first identification information is read from the auxiliary recording region and second identification information is read from the main recording region, and when the first identification information does not correspond to the second identification information from the comparison, outputting the content data read from the main recording region is prohibited.

3. The information playback method according to claim 1, wherein when first identification information is read from the auxiliary recording region and second identification information is read from the main recording region, and when the first identification information does not correspond to the second identification information from the comparison, the content data read from the main recording region is output with a reduced quality.

4. An information playback method comprising:
reading first identification information from an auxiliary recording region of a recording medium, including the auxiliary recording region in which writing of content data is prohibited and a main recording region in which the content data can be written and reading second identification information from the main recording region, and when first identification information is read from the auxiliary recording region and second identification information is read from the main recording region, comparing the read first identification information with the read second identification information, and decoding encrypted content data recorded in the main recording region in accordance with the first identification information; and when first identification information is not read from the auxiliary recording region or second identification information is not read from the main recording region, outputting the content data read from the main recording region.

5. An information playback apparatus comprising:
playback means for playing back a recording medium including an auxiliary recording region in which writing of content data is prohibited and a main recording region in which the content data can be written;
output means for outputting the content data played back from the main recording region by the playback means; and
output control means for, when first identification information is read from the auxiliary recording region and second identification information is read from the main recording region, controlling the output means to output the content data played back from the main recording region when the first identification information and the second identification information are compared with each other and the first identification information corresponds to the second identification information, and when first identification information is not read from the auxiliary recording region or second identification information is not read from the main recording region, controlling the output means to output the content data played back from the main recording region.

6. The information playback apparatus according to claim 5, wherein, when first identification information is read from the auxiliary recording region and second identification information is read from the main recording region, the output control means prohibits outputting the content data played back from the main recording region when the first identification information does not correspond to the second identification information.

7. The information generation apparatus according to claim 5, wherein, when first identification information is read from the auxiliary recording region and second identification information is read from the main recording region, the output control means outputs the content data played back from the main recording region with a reduced quality when the first identification information does not correspond to the second identification information.

8. An information playback apparatus comprising:
playback means for playing back a recording medium including an auxiliary recording region that is not capable of recording content data and a main recording region that is capable of recording the content data;
decoding means for decoding encrypted content data; and
decoding control means for, when first identification information is read from the auxiliary recording region and second identification information is read from the main recording region, controlling the decoding means to decode the encrypted content data played back from the main recording region in accordance with any one of the first identification information and the second identification information when the first identification information is compared with the second identification information and the first identification information corresponds to the second identification information, and when first identification information is not read from the auxiliary recording region or second identification information is not read from the main recording region, controlling the output means to output the content data played back from the main recording region.

9. An information playback apparatus comprising:
a playback unit configured to play back a recording medium including an auxiliary recording region in which writing of content data is prohibited and a main recording region in which the content data can be written;
an output unit configured to output the content data played back from the main recording region by the playback means; and
an output control unit configured to, when first identification information is read from the auxiliary recording region and second identification information is read from the main recording region, control the output means to output the content data played back from the main recording region when the first identification information and the second identification information are compared with each other and the first identification information corresponds to the second identification information, and when first identification information is not read from the auxiliary recording region or second identification information is not read from the main recording region, controlling the output means to output the content data played back from the main recording region.

* * * * *